US008100145B2

(12) United States Patent
Desbois-Renaudin

(10) Patent No.: US 8,100,145 B2
(45) Date of Patent: Jan. 24, 2012

(54) LIFD VALVE ASSEMBLY

(75) Inventor: Matthieu Desbois-Renaudin, Lyons (FR)

(73) Assignee: Robert Bosch GmbH, Stuttgart (DE)

( * ) Notice: Subject to any disclaimer, the term of this patent is extended or adjusted under 35 U.S.C. 154(b) by 690 days.

(21) Appl. No.: 12/282,089

(22) PCT Filed: Feb. 10, 2007

(86) PCT No.: PCT/EP2007/001147

§ 371 (c)(1),
(2), (4) Date: Sep. 8, 2008

(87) PCT Pub. No.: WO2007/104394

PCT Pub. Date: Sep. 20, 2007

(65) Prior Publication Data

US 2009/0007976 A1 Jan. 8, 2009

(30) Foreign Application Priority Data

| | | |
|---|---|---|
| Mar. 13, 2006 | (DE) | 10 2006 011 463 |
| May 10, 2006 | (DE) | 10 2006 021 814 |
| Sep. 20, 2006 | (DE) | 10 2006 044 195 |
| Oct. 20, 2006 | (DE) | 10 2006 049 584 |

(51) Int. Cl.
*F16K 11/07* (2006.01)

(52) U.S. Cl. .................. 137/625.69; 137/514.3; 251/50; 91/446; 91/448; 91/518

(58) Field of Classification Search ............. 137/625.69, 137/625.25, 625.67, 625.66, 625.6, 514.3, 137/514.5, 514.7, 596.18, 596.17, 494; 251/48, 50; 91/420, 446, 447, 468, 518
See application file for complete search history.

(56) References Cited

U.S. PATENT DOCUMENTS

| | | | | |
|---|---|---|---|---|
| 5,067,389 | A | 11/1991 | St. Hermain | |
| 5,305,789 | A | 4/1994 | Rivolier | |
| 5,535,663 | A | 7/1996 | Yamashita et al. | |
| 5,592,967 | A * | 1/1997 | Cho | 137/522 |
| 6,915,729 | B2 * | 7/2005 | Kim | 91/445 |

FOREIGN PATENT DOCUMENTS

| | | |
|---|---|---|
| DE | 35 40 061 | 5/1987 |
| EP | 0 566 449 | 10/1993 |
| EP | 1 023 508 | 8/2000 |
| FR | 2 756 349 | 5/1998 |

* cited by examiner

*Primary Examiner* — Craig Schneider
(74) *Attorney, Agent, or Firm* — Michael J. Striker

(57) ABSTRACT

An LIFD valve assembly has a pressure balance device a pressure balance slide of which is urged in the opening direction by a pressure downstream of a metering aperture and in the closing direction by a control pressure preferably corresponding to the highest load pressure of a plurality of consumers, and a load pressure downstream of the metering aperture is reportable to a line via the pressure balance device, and a load-maintaining device that can be put in a closing position, in which position a pressure medium flow path from a consumer to the metering aperture is blocked. The pressure balance slide is embodied in divided fashion, with an upper part and a lower part, wherein the latter is guided on the upper part, and determines the pressure balance device throttle cross section with a pressure balance control edge and embodies a closing body of the load-maintaining device.

19 Claims, 9 Drawing Sheets

LIFD VALVE ASSEMBLY

CROSS-REFERENCE TO RELATED APPLICATIONS

The invention described and claimed hereinbelow is also described in German Patent Applications DE 10 2006 011 463.9 filed on Mar. 13, 2006, DE 10 2006 021 814.0 filed on May 10, 2006, DE 10, 2006 044 195.8 filed on Sep. 20, 2006 and DE 10 2006 049 584.5 filed on Oct. 20, 2006. These German Patent Applications, whose subject matter is incorporated here by reference, provides the basis for a claim of priority of invention under 35 U.S.C. 119(a)-(d).

BACKGROUND OF THE INVENTION

The present invention relates an LIFD valve assembly and to a valve block having many such LIFD valves.

The fundamental structure of such LIFD valve assemblies is known, for instance from European Patent Disclosure EP 0 566 449 A1 or EP 0 566 449 B1. This is a hydraulic control arrangement on the load-sensing principle, in which in each case an adjusting pump is set as a function of the highest load pressure of the actuated hydraulic consumer in such a way that the inflow pressure is above the highest load pressure by a defined pressure difference. The pressure medium flows to the hydraulic consumers via adjustable metering apertures, which are each located between a pump line, originating at the adjusting pump, and the respective consumer. By means of pressure balance devices connected downstream of the respective metering apertures, it is attained that, given a sufficient quantity of pressure medium furnished regardless of the load pressures of the hydraulic consumers, a certain pressure difference exists via the metering apertures, so that the quantity of pressure medium flowing to a hydraulic consumer now depends only on the opening cross section of the respective metering aperture. If one metering aperture is opened wider, then more pressure medium must flow by way of it in order to generate the defined pressure difference. The adjusting pump is adjusted in each case such that it furnishes the required quantity of pressure medium. This is therefore also known as demand flow control.

The pressure balance devices downstream of the metering apertures are urged in the opening direction by the pressure downstream of the respective metering aperture and in the closing direction by a control pressure, prevailing in a rear control chamber, that is typically equivalent to the highest load pressure of all the hydraulic consumers. If upon a simultaneous actuation of a plurality of hydraulic consumers the metering apertures are made to be so wide open that the quantity of pressure medium, furnished by the hydraulic pump adjusted up to a stop is less than the total quantity of pressure medium pumped, then the quantities of pressure medium flowing to the individual hydraulic consumers are reduced in proportion, regardless of the load pressure of the various hydraulic consumers. This is accordingly called control with load-independent flow distribution (LIFD control).

To prevent the load from collapsing if the pump pressure is inadequate, a load-maintaining device is located in the pressure medium flow path between each consumer and the pressure balance device associated with it. This is typically embodied with a valve cone, which upon a reverse flow of pressure medium from the consumer in the direction of the metering aperture blocks off the pressure medium flow path essentially without leakage, so that the consumer cannot collapse in the event of an unwanted reduction of the pump pressure. The disadvantage of this embodiment is that considerable engineering effort is needed to integrate the load-maintaining device or load-maintaining devices into the valve block. Moreover, these load-maintaining devices require complex conduit courses and occupy considerable installation space, so that a compact embodiment of the valve assembly is possible only with difficulty. A further disadvantage is that the load-maintaining devices have high hydraulic resistance.

To overcome this disadvantage, it is proposed in U.S. Pat. No. 5,535,663, European Patent Disclosure EP 1 023 508 B1, and U.S. Pat. No. 5,067,389 that the individual pressure balance devices associated with the respective consumer be embodied in two parts, with one upper part and one lower part, the lower part acting as a load-maintaining device. In all these known versions, the two-part pressure balance device can be manufactured only with major production effort and expense. Moreover, the conduit course for picking up the individual load pressure downstream of the metering aperture is embodied in a very complex fashion.

SUMMARY OF THE INVENTION

By comparison, it is the object of the invention to create an LIFD valve assembly and a valve block embodied with a plurality of such LIFD valve assemblies, in which a collapse of the load can be prevented at little engineering effort or expense and little hydraulic resistance.

According to the invention, with the point of departure being the closest prior art in EP 0 566 449 B1, the pressure balance is embodied in two parts, with one upper part and one lower part, and the lower part is guided on the upper part. As a result, the housing portion that receives the pressure balance can be embodied much more simply than in the two-part pressure balance devices known per se, in which the upper and lower parts are each guided in the housing. The lower part then forms a closing body for load holding and has a pressure balance control edge that determines the throttle cross section of the pressure balance device.

In a preferred exemplary embodiment, the guide diameter between the upper and lower parts is less than the valve seat diameter.

The upper part can be guided either directly in the housing or inside a valve bush inserted into the housing. It is preferable for the outer guide diameter of the upper part to be equal to or greater than the valve seat diameter.

The lower part of the two-part pressure balance device is preferably embodied with a connecting conduit, which discharges in a chamber defined by the upper part and by the lower part and in which approximately the same pressure prevails as at the inlet to the pressure balance device.

The load reporting is especially simple if the upper part is embodied with a control edge, by way of which a communication with the LS line can be opened.

In a preferred exemplary embodiment, this control edge can be embodied by a transverse bore, in which an axial bore terminates which communicates with the chamber between the upper part and the lower part.

Between the upper and lower parts, a weak spring can be provided that urges the lower part in the closing direction, that is, toward the valve seat.

The valve cone(s) of the valve part that makes the load holding function possible can be embodied either on the lower part or on the housing.

In the first alternative, the end face of the upper part, toward the valve seat, is recessed such that the part of the valve cone located downstream of the valve seat is in pressure equilibrium.

Regulation can be further improved if fine-control notches are embodied on the lower part.

The lower part can be guided on an outer circumferential portion or an inner circumferential portion of the upper part.

During the operation of the pressure balance device, the upper part and the lower part can contact one another; the lower part can run up against an inner end face or an outer end face of the upper part.

An LIFD valve assembly associated with a consumer preferably has a continuously variable multiposition valve, with a speed part embodying the metering aperture and a directional part located downstream of the pressure balance device, by way of which latter part a pressure medium flow path from the pressure balance device to a consumer connection and from another consumer connection to a tank can be opened.

In one exemplary embodiment of the invention, the two-part pressure balance slide is assigned a damping device, so that high-frequency pressure fluctuations can be damped.

In a specific embodiment, this damping device is embodied by a nozzle bore, by way of which a rear chamber of the pressure balance slide communicates with the LS line. This nozzle bore is open, regardless of whether the highest pressure is reported to the LS line via the pressure balance slide, or not.

To improve the function of the pressure balance device, the pressure balance slide can be embodied with a sliding seat.

The valve block, for instance of a mobile work unit, is preferably embodied in disk-like fashion with a plurality of such LIFD valve assemblies.

Preferred exemplary embodiments of the invention will be described in further detail below in conjunction with schematic drawings.

DESCRIPTION OF THE PREFERRED EMBODIMENTS

Figure 1:
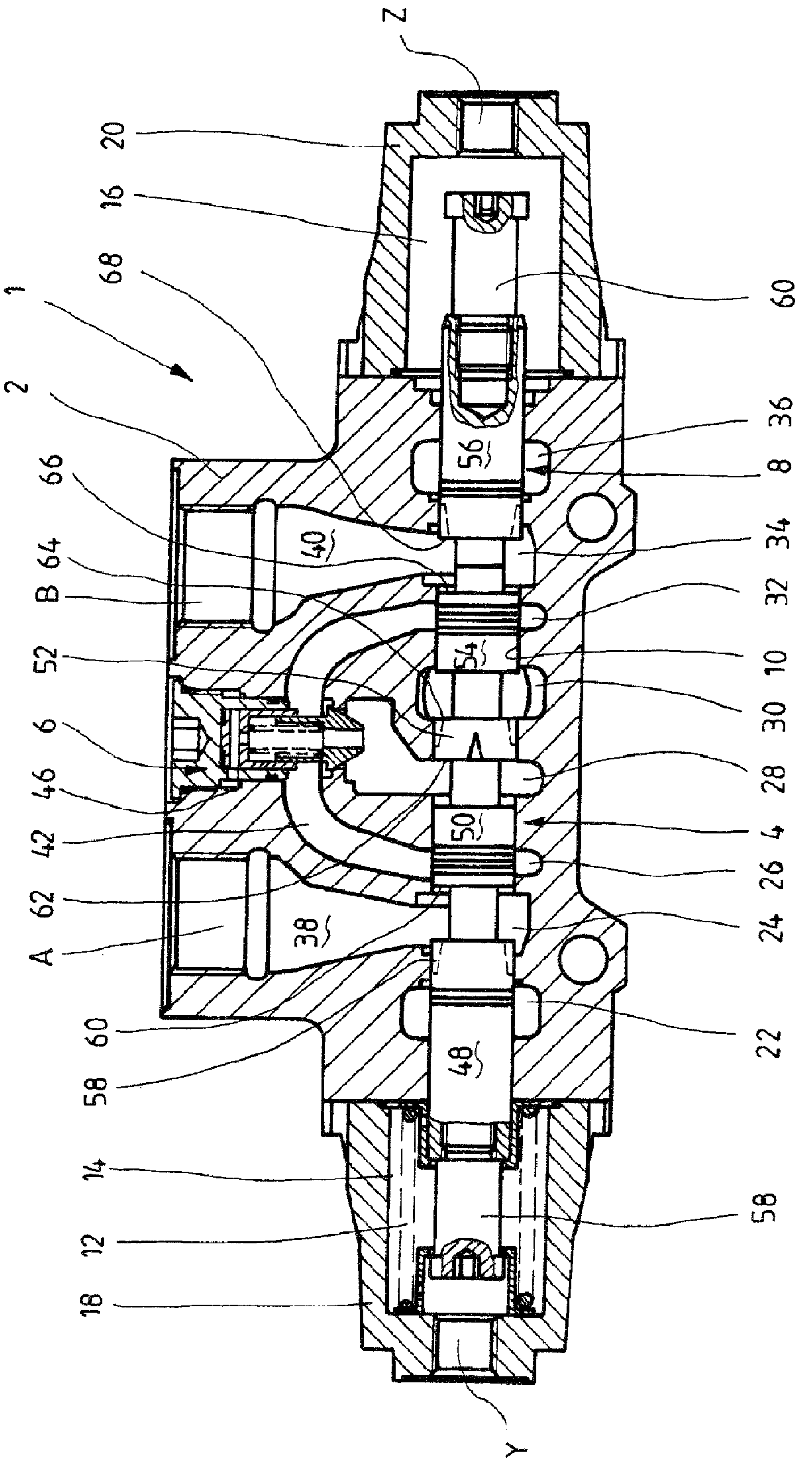
FIG. 1 is a sectional view of a valve disk of an LIFD valve block.

FIG. 1 shows a section through a valve disk 1 of a mobile control block of a mobile work unit, such as a compact excavator, mini-excavator, excavator-type loader, or wheeled loader. Via the valve disk 1, a pressure chamber of a consumer, such as a hydraulic cylinder, can communicate with an LS pump, and another pressure chamber of this consumer can communicate with a tank, in order to bring about an extension or retraction motion of the hydraulic cylinder. As seen in the sectional view, the valve disk 1 has a housing 2, on which a work connection A and a work connection B are embodied, to which the associated consumers are connected. A continuously variable multiposition valve 4 and an LIFD pressure balance device 6 are received in the housing 2.

The continuously adjustable multiposition valve 4 has approximately the same fundamental construction as described in EP 0 566 449 B1, so that here only those components required for comprehension will be described, and otherwise reference is made to the prior art with regard to LIFD valve assemblies. The multiposition valve 4 has a valve slide 8, which is received axially displaceably in a valve bore 10 and is prestressed into its represented center position by means of a centering spring assembly 12. Both end sections of the valve slide 8 project in cantilevered fashion from the housing 2 and dip into respective control chambers 14 and 16, which is defined by respective valve caps 18, 20, flanged to the valve disk 2, and the centering spring assembly 12 is received in the control chamber 14 on the left in FIG. 1. The valve caps 18, 20 are each provided with a respective control connection y, z, which are each connected to control lines, so that by application of a control pressure difference, the valve slide 8 can be deflected out of its center position shown, counter to the force of the centering spring assembly 12.

The valve bore 10, in the representation in FIG. 1, extends from left to right in the radial direction to a first tank chamber 22, a first forward flow chamber 24, a first pressure balance outflow chamber 26, an inflow chamber 28, a pressure chamber 30, a second pressure balance outflow chamber 32, a second forward flow chamber 34, and a second tank chamber 36. The tank chambers 22, 36 of all the valve disks 1 in the valve block communicate with a tank connector. The forward flow chamber 24 communicates with the work connection A via a work conduit 38, and the forward flow chamber 34 communicates with the work connection B via a work conduit 40. The two pressure balance outflow chambers 26, 32 communicate via a curved conduit 42 that is connected to the outlet of the pressure balance device 6. The input of the pressure balance device is connected to the inflow chamber 28 via a pressure balance conduit 44. The pressure chamber 30 communicates via a pump line with the pressure connection of the aforementioned LS pump. The triggering of this LS pump is effected as a function of the highest load pressure of all the consumers connected to the valve block. This highest load pressure is picked up from the consumers via an alternating valve cascade and prevails in an LS conduit 46. A tank collar 48, a work collar 50 adjacent to it, a center measuring aperture collar 52, a further work collar 54, and a further tank collar 58 are embodied on the valve slide 8 by a plurality of annular grooves; the two tank collars 48, 56 embody the end portions of the valve slide 8, into which portions anchors 58, 60 are screwed on which the centering device 12, for instance, is braced, and which plunge into the control chambers 14, 16.

The aforementioned collars are embodied with a work control edge 58, a work control edge 60, measuring aperture control edges 62, 64, a further work control edge 66, or respectively a further tank control edge 68, and the control edges 68, 64, 62 and 58 are embodied with fine-control notches. In the basic position shown, the communication between the work connections A, B and the tank chambers 22, 36 and the pressure chamber 30 is blocked off. By displacement of the valve slide 36 to the left (view in FIG. 1), a measuring aperture cross section, which determines the volumetric flow of pressure medium and thus the actuation speed of the consumer, is opened via the measuring aperture control edge 62 of the valve slide 8. The pressure medium can then flow from the pressure chamber 30 into the inflow chamber 28 via the opened metering aperture and is then throttled via the split in two pressure balance device 6 to such an extent that the individual load pressure prevails at the pressure balance outlet, and a pressure approximately equivalent to the highest load pressure prevails at the pressure balance inlet. The pressure medium can then flow through the cross section, opened via the work control edge 66, of an directional part, from the curved conduit 42 into the second forward flow chamber 34, and from there, via the work conduit 40 and the connection B, to the pressure chamber of the connected consumer. The pressure medium positively displaced from the other pressure chamber of the consumer flows via the work connection A, the work conduit 38, the forward flow chamber 24, and the cross section, opened via the tank control edge 58 of the directional part, into the first tank chamber 22, and from there to the tank via the tank connection (not shown). The supply of pressure medium to the pressure chamber connected to the work connection A is effected in a corresponding way, by displacement of the valve slide 8 to the right from its center position shown.

The construction of the two-part pressure balance device 6 will be described in further detail in conjunction with the other drawings.

Figure 2:
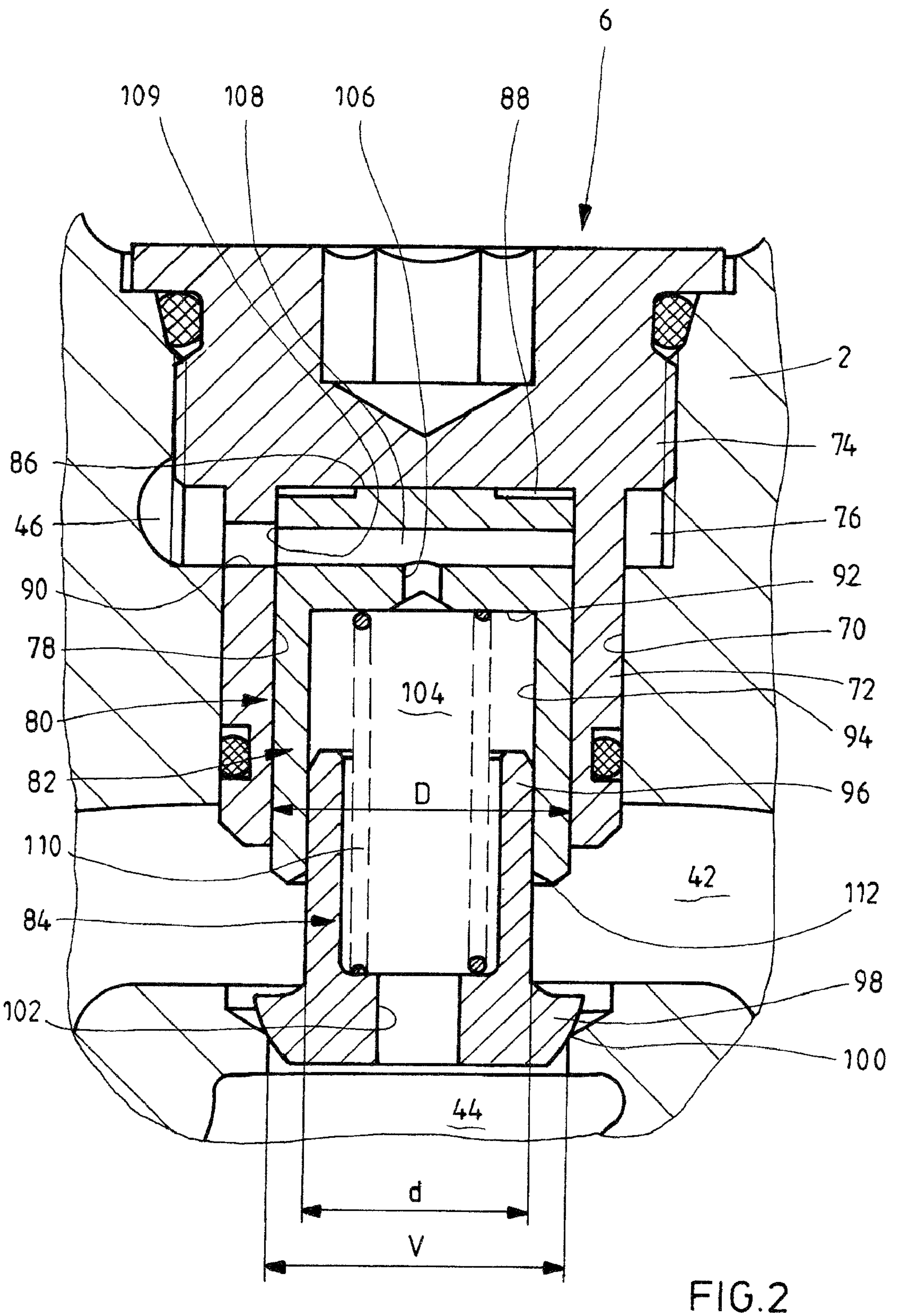
FIG. 2 shows a pressure balance device for an LIFD valve block of FIG. 1.

FIG. 2 shows a first exemplary embodiment of a pressure balance device 6, which can be used in a circuit in accordance with FIG. 1. This pressure balance device 6 is inserted into a graduated pressure balance bore 70, discharging into the curved conduit 42, and in the exemplary embodiment shown, it has a valve bush 72, which is screwed into the pressure balance bore 70 and is sealed off via seals from the curved conduit 42 and from the outside. A radially widened head 74 provided with a screw-in thread is offset in the axial direction from an annular end face of the pressure balance bore 70, so that an annular chamber 76 is formed, into which the LS conduit 46 discharges. The valve bush 72 has a guide bore 78, embodied as a blind bore, in some portions of which a pressure balance slide 80 is guided.

According to the invention, this pressure balance slide 80 is embodied in two parts, with one upper part 82 and one lower part 84. The approximately cup-shaped upper part 82 is guided along its outer circumference in the guide bore 78, and in the basic position shown it rests with an end face 86 on the bottom of the guide bore 78 that is embodied as a blind bore. On this end face 86, there are recesses 88, so that the space between the end face 86 and the bottom of the guide bore 78 communicates with the LS conduit 46 via fine grooves, not shown, on the outer circumference and via a radial bore 90. Thus the end face 86 of the upper part 82 is always acted upon by the highest load pressure, prevailing in the LS conduit 46, of all the actuated consumers.

The cup-shaped upper part 82 has an inner chamber with a bottom 92 and a cylindrical inner circumferential wall 94, along which a guide protrusion 96 of the lower part 84 is guided. This lower part has a mushroom-shaped valve cone 98, which protrudes radially relative to the guide protrusion 96 and is prestressed against a seat edge 100 in the housing 2. Via this valve seat, the communication from the curved conduit 42 to the pressure balance conduit 44 can be blocked, so that no pressure medium can flow out from the work connection communicating with the pump. The lower part 84 is embodied with an axial through bore 102, which widens radially toward the upper part 82 and by way of which the pressure balance conduit 44 communicates with a chamber 104 embodied between the lower part 84 and the upper part 82. This chamber, in the basic position shown (no consumer actuated, pump not pivoted out of the way) communicates with the radial bore 90 via an axial bore 106 and a transverse bore 108 of the upper part 82. In other words, in this position of the upper part 82, the pressure prevailing in the pressure balance conduit 44 is communicated upstream of the pressure balance device 6 to the LS conduit 46; such a position of the upper part will be established whenever the load pressure of the consumer connected to the work connections A, B is the highest load pressure of all the consumers. As will be described in further detail hereinafter, however, in this case the lower part 84 is lifted from the seat edge 100 by the pressure in the pressure balance conduit 44, and the pressure balance device is opened completely so that the pressure in the curved conduit 42 is equal to the highest load pressure in the pressure balance conduit 44.

In the exemplary embodiment shown, a comparatively weak spring 110 is located between the upper part 82 and the lower part 84; it is braced on one end on the bottom 92 of the upper part and on the other on an annular end face of the through-bore 102 of the lower part 84 and thus prestresses the lower part into its closing position. The annular end face 112 is chamfered, so that it cannot rest with its full surface on the back side of the valve cone 98 that is lifting off the valve seat 100. In the exemplary embodiment shown, the valve seat diameter V is equal to the outer diameter D of the upper part 82, or in other words the diameter with which the upper part 82 is guided in the valve bush 72. Moreover, the outer diameter d of the guide protrusion 96 of the lower part 84 is less than the valve seat diameter V. This partial characteristic is met in all the other exemplary embodiments described below as well.

Figure 3:
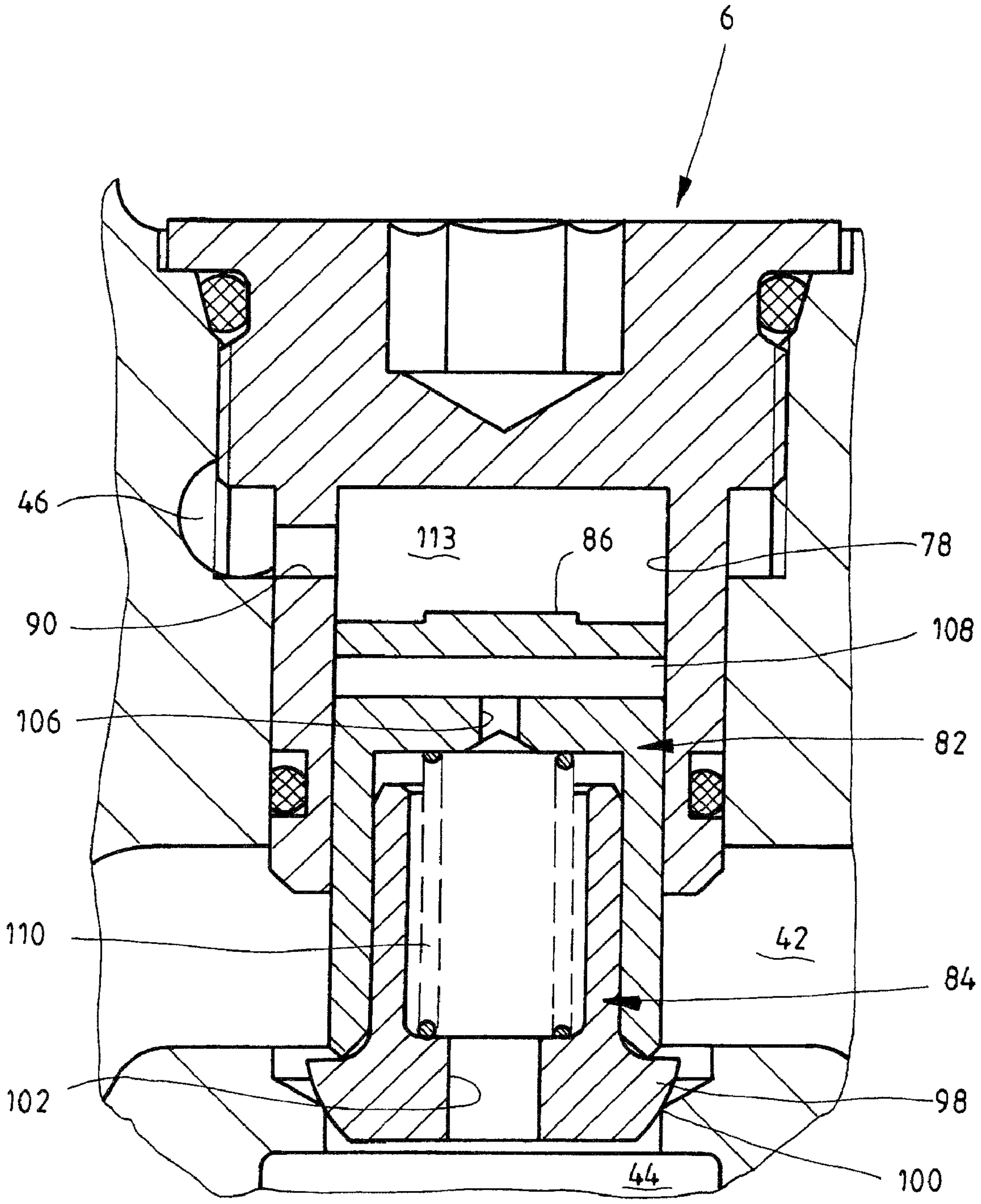
FIG. 3 shows the pressure balance device of FIG. 2 in a load holding position.

In the event that some of the consumers connected to the mobile control block are being supplied with pressure medium, then the highest load pressure prevails in the LS conduit 46, so that the upper part 82 is displaced, counter to the force of the comparatively weak spring and counter to the pressure in the chamber 104, out of the position shown downward into the stop position against the lower part as shown in FIG. 3. The radial bore 90 is closed by a control edge 109 of the upper part 82, which edge is embodied by the transverse bore 108, and the end face 86 is subjected to the pressure in the LS conduit 46 via the radial bore 90. The slight leakage from the transverse bore 106 into the rear control chamber 113 (see FIG. 3) defined by the end face 86 is negligible.

The position shown in FIG. 3 is established for instance whenever the associated consumer is not being supplied with pressure medium, or—as described at the outset—the pressure in the pressure balance conduit 44 drops below the individual load pressure in the curved conduit 42. With the consumer triggered, or in other words upon displacement of the valve slide 8 of the multiposition valve 4 from its basic position shown in FIG. 1, a pressure corresponding to or somewhat higher than the highest load pressure is operative in the pressure balance conduit 44, so that the valve cone 98 is urged in the opening direction with its surface area corresponding to the valve seat diameter V. The surface regions of the valve cone 98 that are located on the far side of the seat edge 100 are in pressure equilibrium because of the chamfer 112. The end face 86 has the diameter D, which in the exemplary embodiment shown is equal to the valve seat diameter V. Because of the somewhat higher pressure, acting in the opening direction, in the pressure balance conduit 44, the valve cone 98 is lifted from the seat edge 100, while the upper part 82 remains approximately in its contact position shown on the lower part 84, as long as the pressure difference between the pressure in the pressure balance conduit 44 and the highest load pressure 46 is greater than the force of the spring 110.

If the pressure in the pressure balance conduit 44 drops, the load holding function becomes operative; the valve cone 98 is moved into its closing position against the seat edge 100 by the force of the spring 110, so that a return flow from the curved conduit 42 to the pressure balance conduit 44 is prevented.

In the case in which the highest load pressure prevails at the associated consumer, the pressure balance device is opened completely, and the pressure in the curved conduit is equivalent to the highest load pressure. The upper part 82 and the lower part 84 are displaced upward jointly, counter to the pressure in the LS conduit 46, until the control edge 109 opens the communication with the radial bore 90, so that the load pressure in the pressure balance conduit 44, corresponding to the highest pressure, is reported to the LS conduit 46, via the through-bore 102, the axial bore 106, the transverse bore 108, and the radial bore 90. The lower part 84 and the upper part 82 do not rest exactly on one another at that time, but instead are spaced apart from one another by a region 104 corresponding to the spring force.

In the control positions of the pressure balance 6, its throttle cross section is determined by the annular gap between the seat edge 100 and the outer circumference of the valve cone. To improve the control performance, fine-control notches 114 may be embodied in accordance with FIG. 4. In this exemplary embodiment, the valve cone 98 is embodied with a shorter axial length, compared to the exemplary embodiment of FIG. 2. Adjoining the valve cone 98, a slide protrusion 116 is embodied, which is provided with the fine-control notches 114. This slide protrusion 116 rests slidingly with its outer circumference on a seat slide face 118 of the housing 2. In this exemplary embodiment as well, the valve seat diameter V is equal to the outer diameter D of the upper part 82 and thus to the diameter of the guide bore 78. The lower part 84, in this exemplary embodiment, is accordingly embodied as a valve slide. Otherwise, this exemplary embodiment corresponds to the exemplary embodiment described above in conjunction with FIGS. 2 and 3, and hence further explanations are unnecessary.

Figure 5:
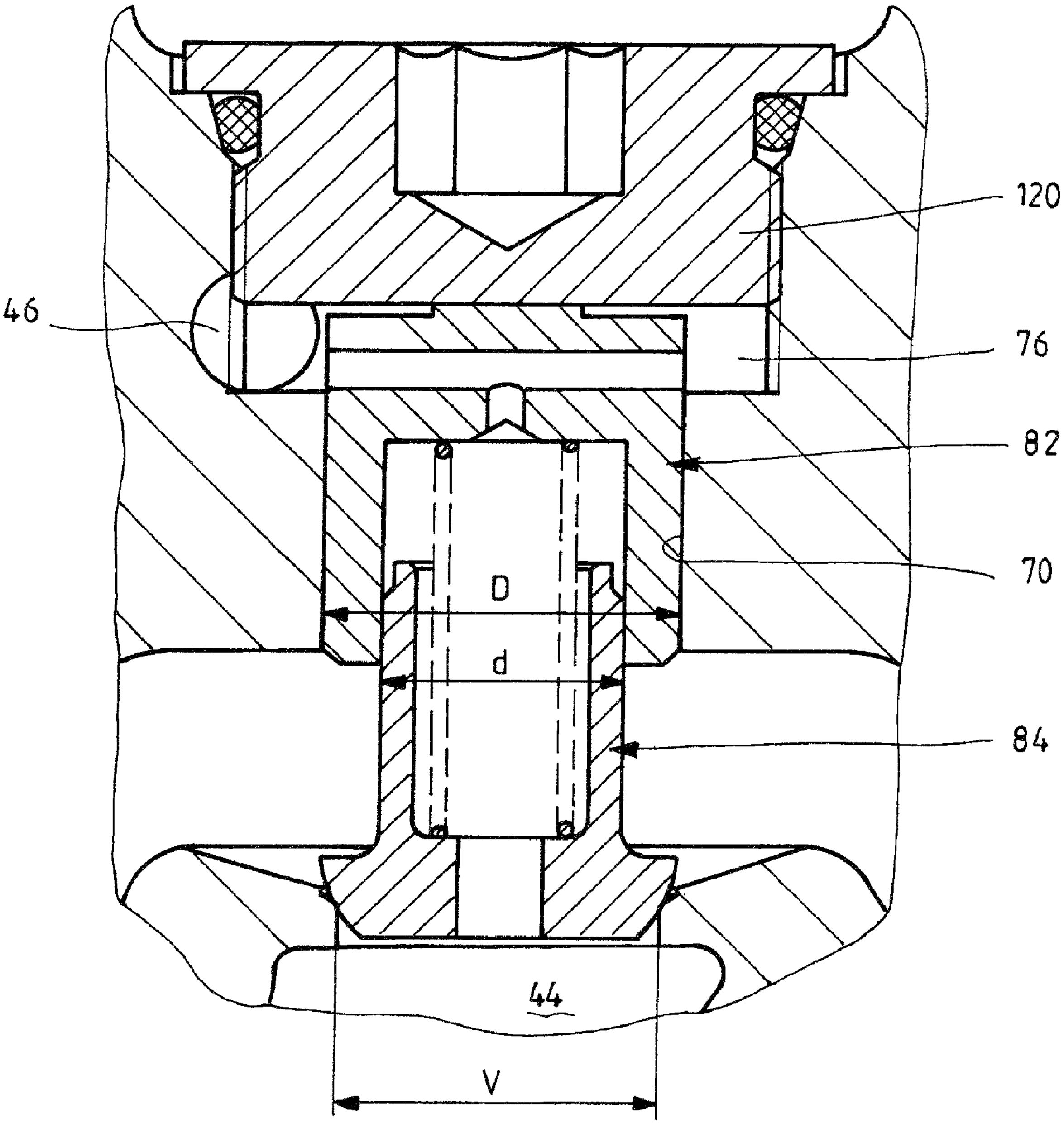
FIG. 5 shows an exemplary embodiment of a simplified pressure balance device.

FIG. 5 shows a simplified variant, in which the valve bush 72 is dispensed with. In this variant, the upper part 82 is guided directly in the pressure balance bore 70, which is closed by a closure screw 120, the geometry of which is approximately equivalent to that of the head 74 of the valve bush, so that once again, an annular chamber 76 is embodied. In this exemplary embodiment, the guided outer diameter D of the upper part 82 is embodied as somewhat greater than the valve seat diameter V, to make the installation of the lower part with the valve cone 98 possible.

Figure 6:
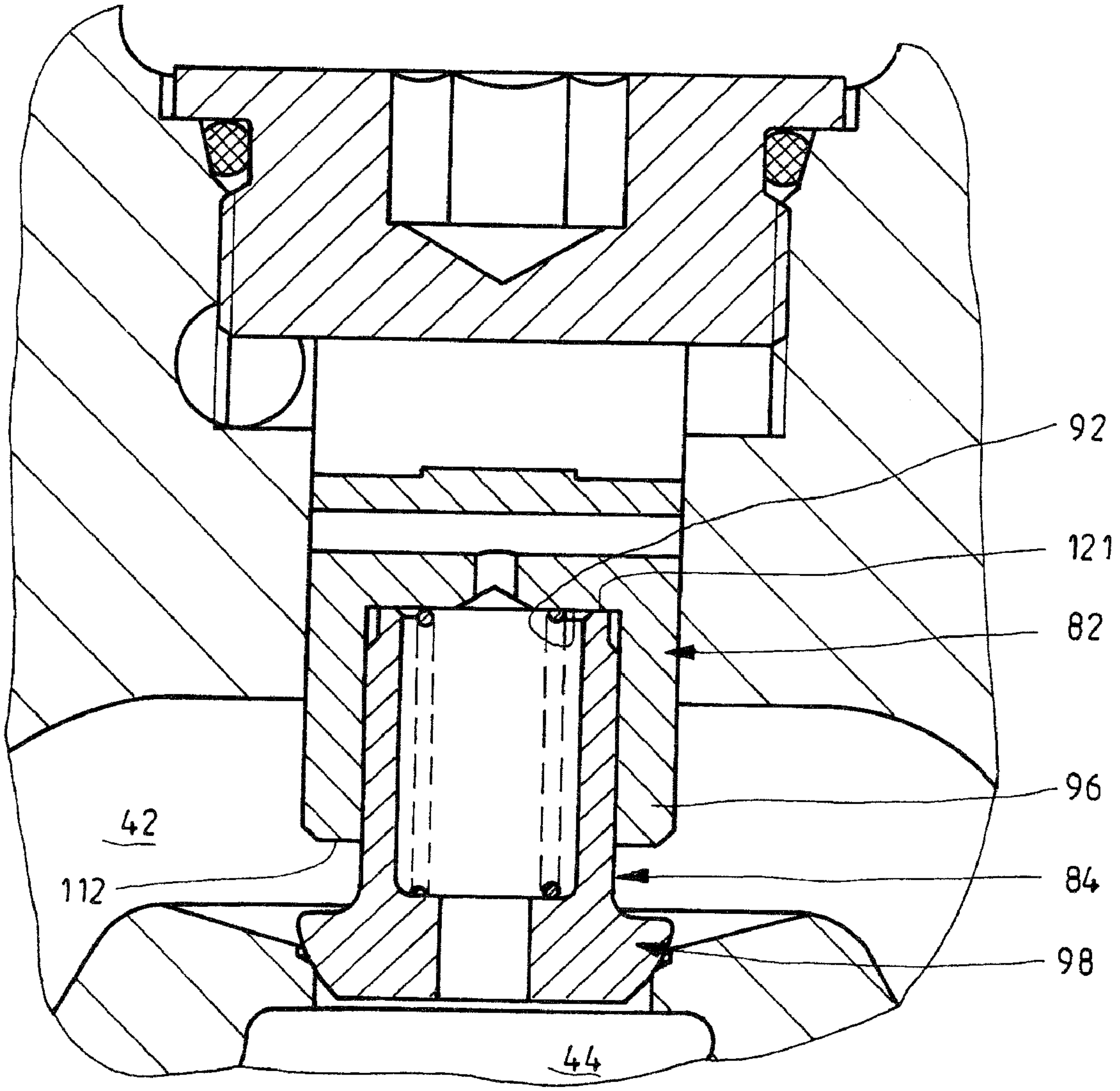
FIG. 6 shows a pressure balance device of FIG. 5 in a load holding position.

As can be seen from FIG. 6, in this exemplary embodiment the upper part 82, in its stop position, does not rest on the back side of the mushroom-shaped valve cone 98; instead, an annular end face 121 of the guide protrusion 96 runs along the bottom 92 of the blind bore of the upper part 82, so that the annular end face 112 is spaced apart from the back side of the valve cone 98. Otherwise, the function and structure of the exemplary embodiment of FIG. 6 are equivalent to those of FIG. 2, so that further explanation can be dispensed with.

Figure 7:
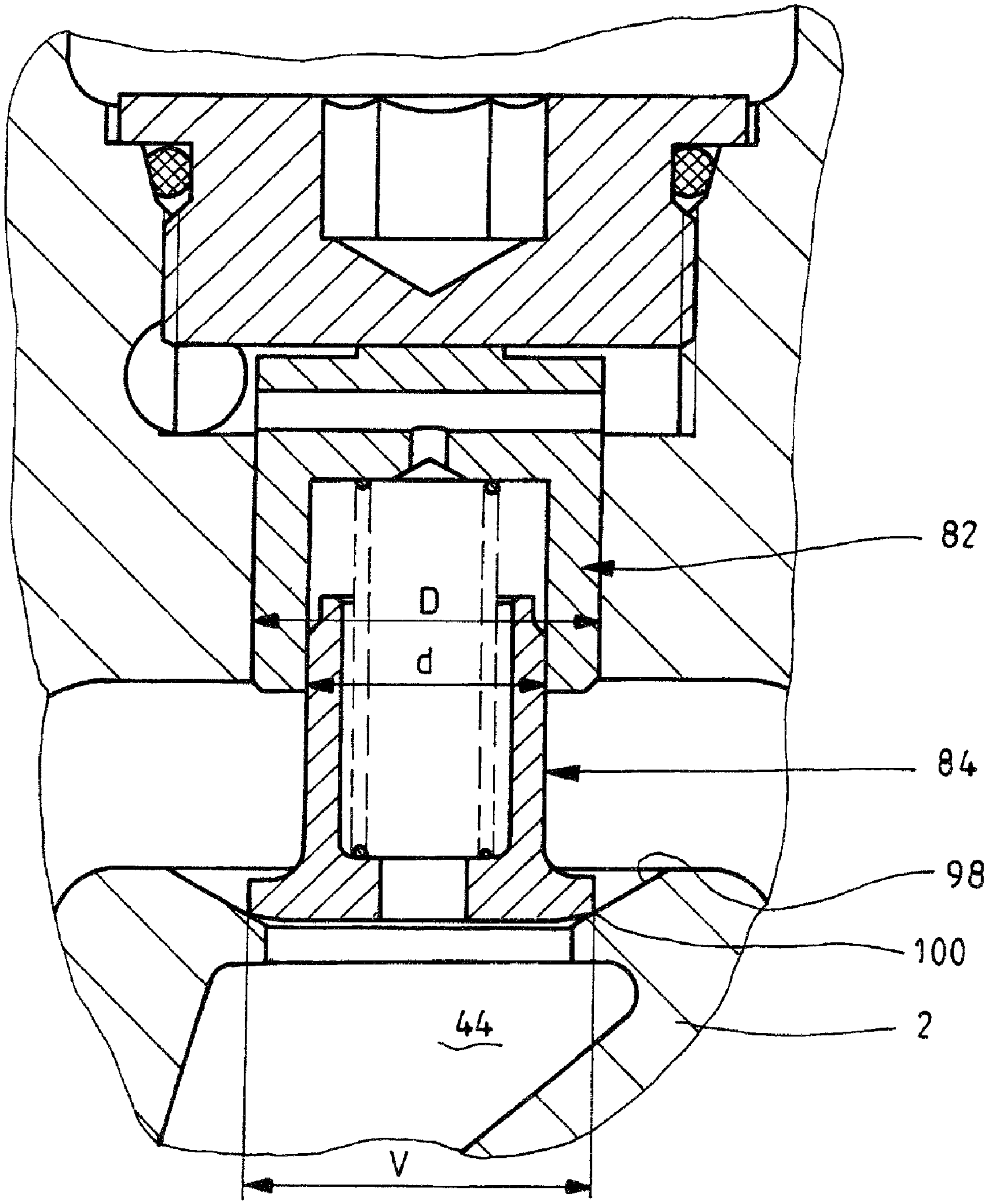
FIG. 7 shows a variant of a pressure balance device in accordance with exemplary embodiment of FIG. 5.

In FIG. 7, a variant of the exemplary embodiment shown in FIGS. 5 and 6 is shown, in which the valve cone 98 is embodied on the housing 2, and the seat edge 100 is embodied in a kinematic reversal on the lower part 84; in this exemplary embodiment, the valve seat diameter V is equal to the guided outer diameter D of the upper part 82, so that the force ratios are approximately the same as in the exemplary embodiment of FIG. 2, while in the exemplary embodiment of FIGS. 5 and 6, because of the greater diameter D compared to V, the forces acting in the closing direction are increased, so that in that exemplary embodiment, the difference between the pressure in the pressure balance 44 and in the LS conduit 46 must be greater than in the other exemplary embodiments.

Figure 8:
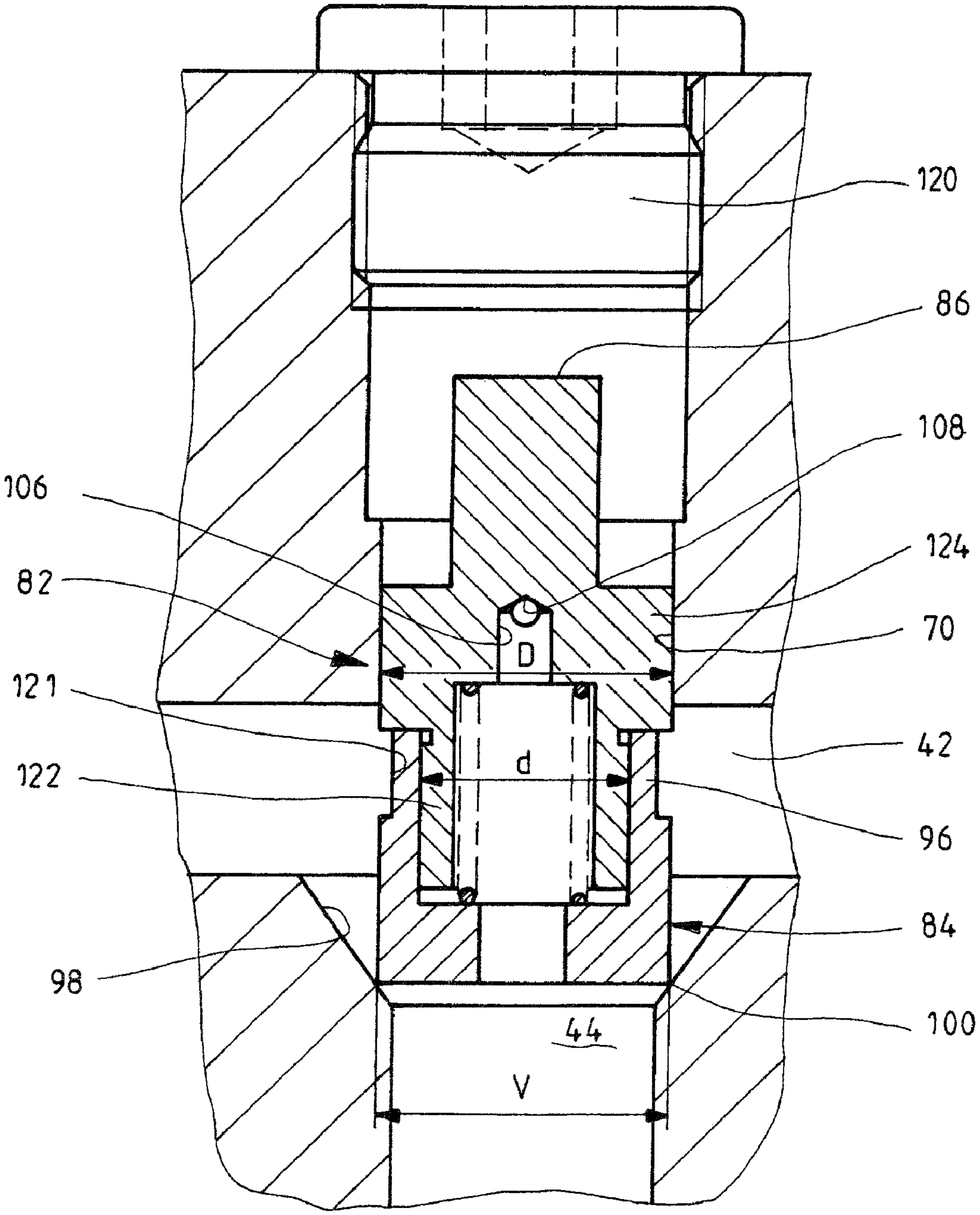
FIG. 8 shows a further exemplary embodiment of a pressure balance device for an LIFD valve assembly of FIG. 1.

In the above-described exemplary embodiments, the lower part 84 is always guided inside the upper part 82. FIG. 8 shows an exemplary embodiment in which the lower part 84, with its guide protrusion 96, is guided on the outer circumference of a guide collar 122 of the upper part 82 that is radially recessed compared to a guide part 124 that is guided directly in the pressure balance bore 70. In this exemplary embodiment, the guide protrusion 96 runs with its annular end face 121, located at the top, along the radial shoulder between the guide collar 122 and the guide part 124. Also in this exemplary embodiment, the seat edge 100 is embodied on the lower part 84, and the cone 98 is embodied on the housing. The valve seat diameter V is also equivalent to the guide diameter of the upper part 82, or in other words to the outer diameter D of the guide part 124 and to the diameter of the pressure balance bore 70. In this exemplary embodiment, the transverse bore 108 extends perpendicular to the plane of the drawing, so that accordingly the LS conduit is not visible, either. However, the construction is otherwise essentially equivalent to the exemplary embodiments described above, and particularly to the exemplary embodiment of FIG. 7.

The guides for the upper and lower parts 82, 84 are each sealingly embodied.

Figure 9:
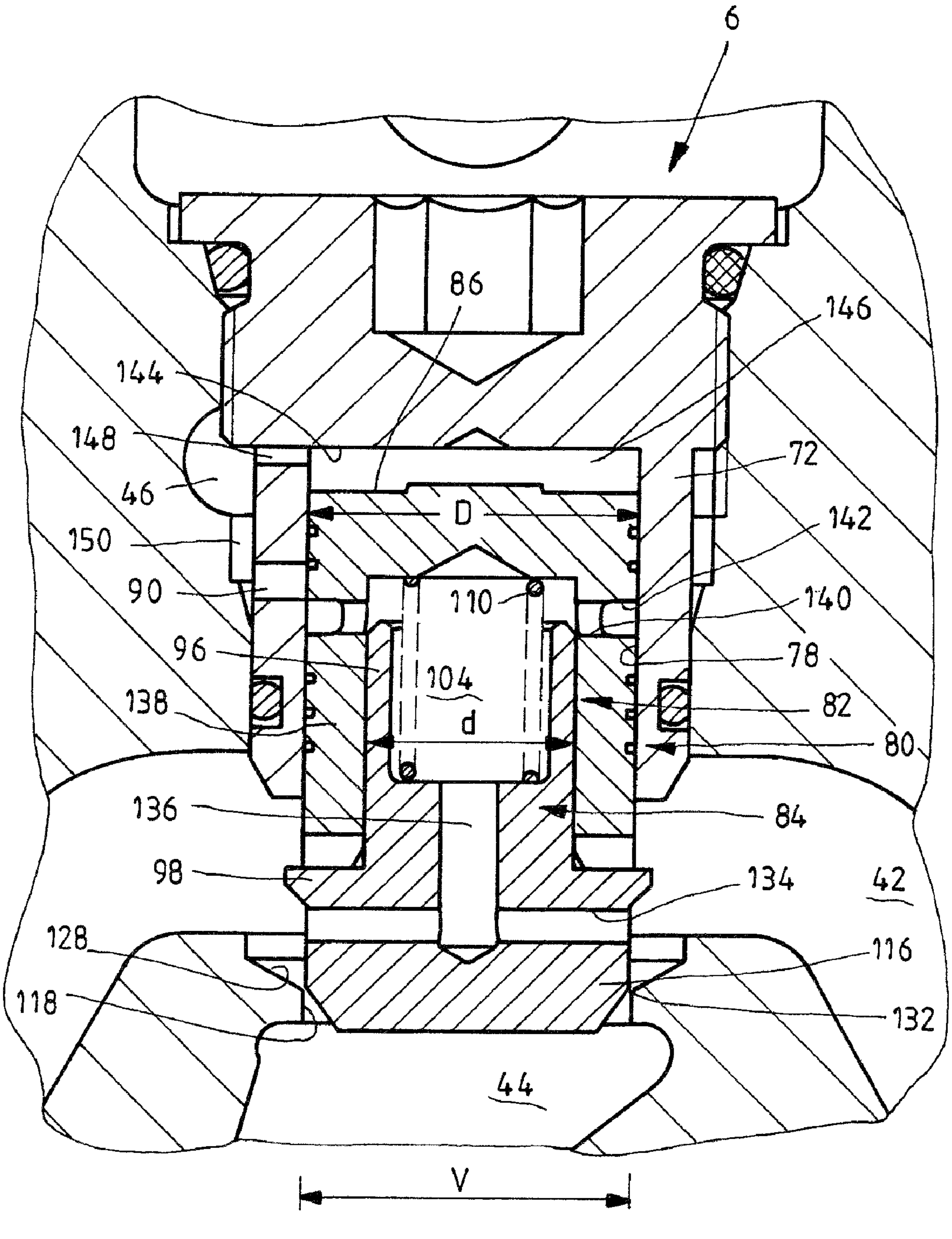
FIG. 9 shows an embodiment with damping.

FIG. 9 shows an exemplary embodiment of a damped pressure balance device. The fundamental construction of this exemplary embodiment is largely equivalent to that of FIGS. 2 and 4, so that with reference to the description thereof, only the essential distinctions will be discussed below.

Figure 4:
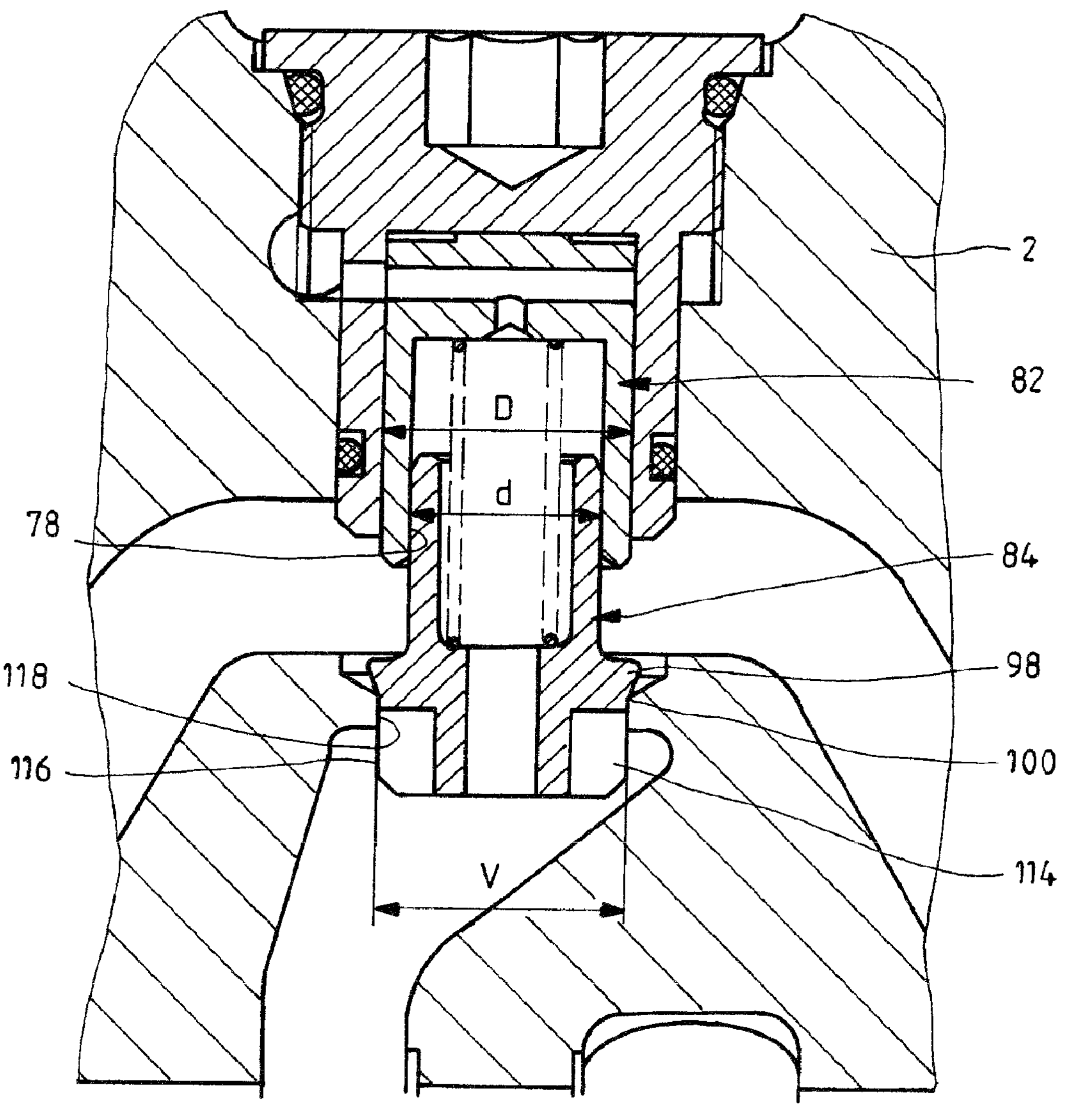
FIG. 4 shows an exemplary embodiment of a pressure balance with fine-control notches.

The exemplary embodiment of an LIFD pressure balance device 6 in FIG. 9 likewise has a valve bush 72, along whose guide bore 78 the upper part 82 of the pressure balance slide 80 is guided axially displaceably. The lower part 84, with its guide protrusion 96, plunges into the cup-shaped upper part 82, and on its end portion, located toward the bottom in FIG. 9, it has a valve body that, as in the exemplary embodiment of FIG. 4, is embodied with a sliding seat. Accordingly, the closing body, similarly to the exemplary embodiments described above, has a valve cone 98, which is adjoined in the axial direction toward the pressure balance conduit 44 by a slide protrusion 116. The valve cone 98 cooperates with a seat 128, while the outer circumference of the slide portion 116 is guided along a seat slide face of the pressure balance conduit 44, so that the opening cross section of the pressure balance device is determined by a control edge 132 formed by way of a chamfer. The control edge 132 may, as in the exemplary embodiment of FIG. 4, be embodied with control notches that determine the initial opening cross section of the pressure balance device. One or more diagonal bores 134 discharge into the slide protrusion 116 and via a middle bore 136 with the chamber 104 between the upper part 82 and the lower part 84.

In an annular jacket 138, surrounding the guide protrusion 96, of the upper part 82, openings 140 are provided that discharge into an annular groove 142. For reporting the highest load pressure to the LS conduit 46, these openings can be made to coincide with the radial bore 90 embodied in the valve bush 72. In fact, in the view in FIG. 9, this direct communication between the chamber 104 and the LS conduit 46 has not been opened, or has been opened with only a minimal opening cross section.

Between the rear end face 86 and an inner end face 144 of the guide bore 78, a rear chamber 146 is defined, which communicates with the LS conduit 46 via a nozzle bore 148. This communication is always open, regardless of the axial position of the upper part 82.

In the view in FIG. 9, the pressure balance device 6 is shown in a control position, in which a throttle cross section is opened via the control edge 132, while to the rear the LS pressure is operative, and the pressure balance slide 80 is urged in the opening direction by the pressure in the pressure balance conduit 44. In the inner chamber 104, via the bores 134, 136, the pressure in the curved conduit 42 is operative, which also acts upon the back side of the valve cone 98 and urges the upper part 82 in the opening direction.

To enable effecting the communication of both the nozzle bore 148 and the radial bore 90, axially spaced apart from it, with the LS conduit 46, this conduit is embodied downward, toward the radial bore 90, with a connecting chamber 150.

The damping of the pressure balance slide 80 into its control positions is effected such that upon an axial displacement of the upper part 82, pressure medium from the rear chamber 146 must be positively displaced via the nozzle bore 148 to the LS conduit or must flow in replenishing fashion from this conduit.

In this exemplary embodiment as well, the valve seat diameter V is equal to the outer diameter D of the upper part, and the diameter d of the guide protrusion 96 is embodied as less than V and D.

With regard to the function of the pressure balance device 6 shown in FIG. 9, reference may be made to the exemplary embodiments described above.

What are disclosed are an LIFD valve assembly and a valve block having many such LIFD valve assemblies with a two-part pressure balance device. A lower part of a pressure balance slide is guided on an upper part, and the lower part, with a portion of the valve assembly fixed to the housing, embodies a valve seat of a load-maintaining device.

The invention claimed is:

1. An LIFD valve assembly, having a pressure balance device (6) a pressure balance slide (80) of which is urged in the opening direction by a pressure downstream of a metering aperture and in the closing direction by a control pressure preferably corresponding to the highest load pressure of a plurality of consumers, and a load pressure downstream of the metering aperture is reportable to line (46) via the pressure balance device (6), and having a load-maintaining device that can be put in a closing position, in which position a pressure medium flow path from a consumer to the metering aperture is blocked, wherein the pressure balance slide (80) is embodied in divided fashion, with an upper part (82) and a lower part (84), wherein the latter is guided on the upper part (82), and determines the pressure balance device throttle cross section with a pressure balance control edge and embodies a closing body (98) of the load-maintaining device.

2. The valve assembly as defined by claim 1, wherein the guide diameter (d) between the upper part (82) and the lower part (84) is less than the valve seat diameter (V).

3. The valve assembly as defined by claim 1, wherein the outside diameter (D) of the upper part (82) is equal to or greater than the valve seat diameter (V).

4. The valve assembly as defined by claim 1, wherein the lower part (84) is embodied with a connecting conduit (102) which discharges into a chamber defined by the upper part (82) and by the lower part (84).

5. The valve assembly as defined by claim 1, wherein the upper part (82) has a control edge (109), by way of which a communication with the line (46) is openable.

6. The valve assembly as defined by claim 4, wherein the control edge (109) is formed by a transverse bore (108) of the upper part (82), in which an axial bore (106) communicating hydraulically with the chamber (104) discharges.

7. The valve assembly as defined by claim 1, wherein a spring (110), which urges the lower part (84) in the closing direction, is located between the upper and lower parts (82, 84).

8. The valve assembly as defined by claim 1, wherein the upper part (82) is guided in a valve bush (72) or in a portion of a housing (2).

9. The valve assembly as defined by claim 1, wherein a valve cone (98) is embodied on the lower part (82) or on the housing.

10. The valve assembly as defined by claim 9, wherein the annular end face (112) toward the valve seat of the upper part (82) is recessed in such a manner that the part of the valve cone (98) located downstream of the valve seat (98, 100) is in pressure equilibrium.

11. The valve assembly as defined by claim 9, wherein fine-control notches (114) are embodied in the region of the valve cone (98).

12. The valve assembly as defined by claim 1, wherein the lower part (84) is guided on an outer circumferential portion (122) or an inner circumferential portion (94) of the upper part (82).

13. The valve assembly as defined by claim 1, wherein the lower part (84), in a stop position, strikes a bottom (92) or an outer end face (112) of the upper part (82).

14. The valve assembly as defined by claim 1, having a continuously variable multiposition valve (4), with a speed part embodying the metering aperture and with a directional part located downstream of the pressure balance device (6), by way of which multiposition valve a pressure medium flow path from the pressure balance device (6) to a consumer connection (A, B) and from another consumer connection (B, A) to a tank is openable.

15. The valve assembly as defined by claim 1, having a damping device (148) for damping the motion of the pressure balance slide (80; 82, 84).

16. The valve assembly as defined by claim 15, wherein the damping device is a nozzle bore (148), by way of which a rear chamber (146), defined by a rear end face (86) of the upper part (82), communicates with the line (46).

17. The valve assembly as defined by claim 16, wherein the nozzle bore (148) is always open toward the rear chamber (146).

18. The valve assembly as defined by claim 1, wherein the closing cone (98) is embodied with a sliding seat.

19. A valve block having a plurality of valve assemblies as defined by claim 1.

* * * * *